(12) United States Patent
Miller et al.

(10) Patent No.: US 11,346,979 B2
(45) Date of Patent: May 31, 2022

(54) AUTOMATED GLOBAL WEATHER NOTIFICATION SYSTEM

(71) Applicant: DTN, LLC, Omaha, NE (US)

(72) Inventors: Ian James Miller, Marietta, GA (US); Jason Linden Geer, Atlanta, GA (US)

(73) Assignee: DTN, LLC, Omaha, NE (US)

( * ) Notice: Subject to any disclaimer, the term of this patent is extended or adjusted under 35 U.S.C. 154(b) by 1081 days.

(21) Appl. No.: 14/469,875

(22) Filed: Aug. 27, 2014

(65) Prior Publication Data
US 2016/0061992 A1 Mar. 3, 2016

(51) Int. Cl.
| | |
|---|---|
| *G01W 1/10* | (2006.01) |
| *G06Q 10/10* | (2012.01) |
| *H04W 4/02* | (2018.01) |
| *H04L 67/52* | (2022.01) |

(52) U.S. Cl.
CPC .............. *G01W 1/10* (2013.01); *G06Q 10/10* (2013.01); *G01W 2201/00* (2013.01); *G01W 2203/00* (2013.01); *H04L 67/18* (2013.01); *H04W 4/02* (2013.01); *Y02A 90/10* (2018.01)

(58) Field of Classification Search
None
See application file for complete search history.

(56) References Cited

U.S. PATENT DOCUMENTS

| | | | | |
|---|---|---|---|---|
| 5,311,184 A | * | 5/1994 | Kuntman | G01S 13/953 342/26 B |
| 6,741,203 B1 | * | 5/2004 | Woodell | G01S 7/2813 342/26 B |
| 6,816,878 B1 | * | 11/2004 | Zimmers | G08B 27/005 340/540 |
| 7,043,368 B1 | * | 5/2006 | Cote | G01W 1/10 345/419 |
| 7,383,130 B1 | | 6/2008 | Koosam | |
| 8,588,821 B1 | * | 11/2013 | Hewinson | G06Q 10/04 340/601 |
| 8,832,121 B2 | * | 9/2014 | Smith | H04M 3/42348 707/708 |

(Continued)

FOREIGN PATENT DOCUMENTS

| | | |
|---|---|---|
| CN | 106662669 B | 12/2019 |
| EP | 2717216 | 4/2014 |

(Continued)

OTHER PUBLICATIONS

NOAA—National Weather Service Instruction, Jun. 4, 2003.*

(Continued)

*Primary Examiner* — Lina M Cordero
(74) *Attorney, Agent, or Firm* — Kutak Rock LLP; Brian L. Main

(57) ABSTRACT

An automated global weather notification system is provided. The automated global weather notification system is capable of obtaining observational weather data, including data form of forecast grids, and applying business rules and conditional variables to that data. Based on the business rules and conditional variables, notifications are generated. Relevant users are identified in particular geographic areas and notifications are delivered to those users via, for example, SMS, MMS, email, or other methods of electronic information delivery.

15 Claims, 7 Drawing Sheets

(56) References Cited

U.S. PATENT DOCUMENTS

| | | | |
|---|---|---|---|
| 8,909,679 B2* | 12/2014 | Root .................. | G01W 1/00 707/803 |
| 2001/0030624 A1* | 10/2001 | Schwoegler ........... | G01W 1/10 342/357.52 |
| 2005/0222770 A1* | 10/2005 | McKewon ............ | G01S 13/951 702/3 |
| 2006/0271297 A1* | 11/2006 | Repelli ................ | G01W 1/00 702/3 |
| 2007/0112511 A1* | 5/2007 | Burfeind ............... | G08G 5/065 701/469 |
| 2009/0210353 A1* | 8/2009 | Mitchell ............... | G01W 1/10 705/36 R |
| 2010/0013629 A1 | 1/2010 | Sznaider et al. | |
| 2013/0234884 A1* | 9/2013 | Bunch .................. | G01S 13/953 342/26 B |
| 2014/0200903 A1* | 7/2014 | Hancock ............... | G06Q 50/22 705/2 |
| 2014/0244188 A1* | 8/2014 | Bai ...................... | F03D 17/00 702/60 |

FOREIGN PATENT DOCUMENTS

| | | | |
|---|---|---|---|
| EP | 3186666 A1 | | 7/2017 |
| JP | 2000075029 A | * | 3/2000 |
| WO | 2009086560 A1 | | 9/2009 |
| WO | 2016033035 A1 | | 3/2016 |

OTHER PUBLICATIONS

International Search Report and Written Opinion, dated Nov. 24, 2015, received in connection with International Patent Application No. PCT/US2015/046681.

"Communication Pursuant to Article 94(3) EPC Received for European Patent Office Application No. 15836368.9, dated Jul. 24, 2020."

"International Preliminary Report on Patentability Received for PCT Application No. PCT/US2015/046681 dated Mar. 9, 2017, 6 Pages".

"International Search Report and Written Opinion Received for PCT Application No. PCT/US2015/046681 dated Nov. 24, 2015, pp. 8."

"First Office Action Received For China Application No. 201580043289.8, dated Aug. 27, 2018, 19 Pages", 19.

"International Search Report Received For European Patent Office Application No. 15836368.9, dated Nov. 24, 2015, 2 Pages.", 2.

"Second Office Action Received For China Application No. 201580043289.8, dated Apr. 12, 2019, 19 Pages", 19.

* cited by examiner

AUTOMATED GLOBAL WEATHER NOTIFICATION SYSTEM

BACKGROUND

Weather forecasts are commonly generated by mathematical forecast models that use observational data collected from weather stations. The mathematical forecast models attempt to model atmospheric behavior(s) to extrapolate the observational data over a certain period of time, i.e., the forecast period. The observational data may include data representing clouds, temperature, humidity, wind, rain, snow, fog, thunderstorms, etc. over a certain geographic area. The mathematical forecast models are run periodically, using the observational data as input information. For example, for a particular geographic location, a forecast model may be run in hourly increments, 15-minute increments, 1-minute increments, or even smaller increments.

Over a geographic area, the forecast model may be run at a plurality of points in the form of a grid. The aggregation of forecasts for these geographic points forms a forecast grid for a particular forecast period. Additional forecasts predicting weather conditions for a different time period can be organized as separate forecast grids. For example, it is possible to have a forecast grid for one hour in the future, a forecast grid for two hours in the future, and so on.

While basic forecast grids are generally known in the art, they typically contain raw data that requires additional processing before the data can be presented to an end user. The additional processing typically involves human intervention, which has been necessary in order to account for the many variables present in weather forecasting. Human intervention has been especially necessary when deciding to issue informational weather notifications. For example, a human is typically responsible for determining whether a particular weather condition in a particular geographic location is worthy of a notification, based on the information and numerous variables available to that person. The decision of when to change, update, and/or cancel that notification is similarly left to a human. This need for human intervention has many shortcomings, including a lack of accuracy, lack of speed, and increased cost.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

DETAILED DESCRIPTION

An automated global weather notification system as described herein. The automated global weather notification system may obtain and process observational weather data in order to automatically determine if a weather notification should be generated. The system is capable of generating weather notifications for particular geographic locations based on the observational weather data as well as the application of business rules and conditional variables that may vary based upon the particular geography at issue. For example, the global weather notification system may obtain observational weather data in the form of forecasts grids and apply business rules and/or conditional variables to the forecast grid data. The system may also identify relevant users in specific geographic locations and deliver notifications to those users. Notifications may be delivered by any means, including for example, SMS, MMS, e-mail, or other methods of electronic information delivery.

Figure 1:
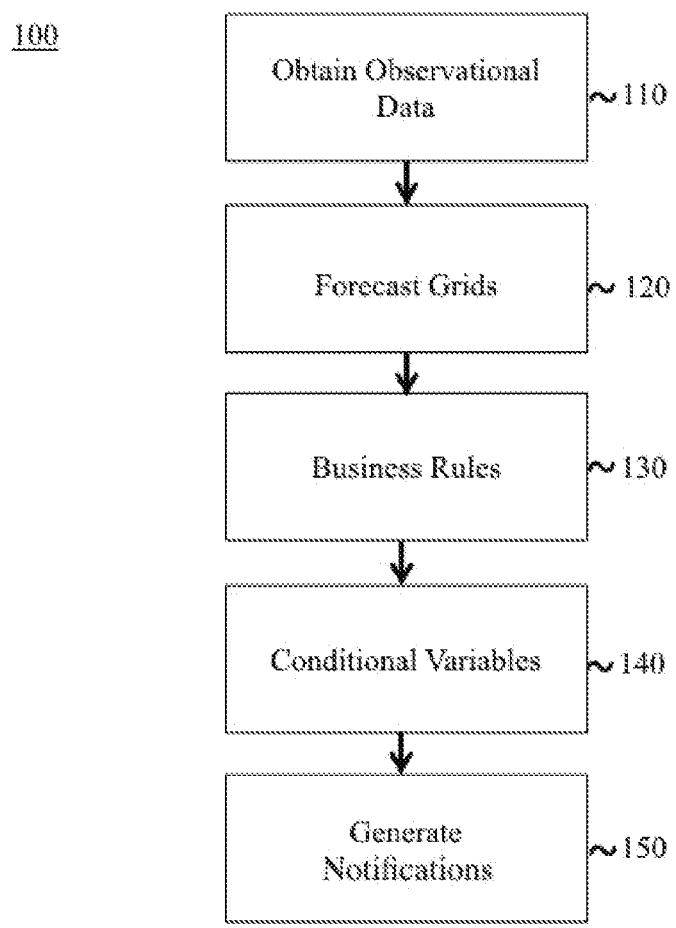
FIG. 1 is a flow diagram for an exemplary embodiment of the automated global weather notification system.

Referring to FIG. 1, a flow diagram of an exemplary embodiment of the automated global weather notification system 100 is depicted. The automated global weather notification system 100 begins with a block representing a step of obtaining observational data 110. The observational data 110 may be obtained via weather data collection stations, weather databases, satellites, individual weather measuring devices, and/or any other method of collecting and distributing weather data. The collected observational data 110 may be stored in a database that includes multiple categories of weather data information. For example, the database may include categories for temperature, rainfall, snowfall, ice, wind, thunderstorms, fog, and/or any other potential weather category.

According to one embodiment, a step of generating forecast grids 120 follows the step of obtaining observational data 110. Forecast grids 120 may contain aggregated observational data 110 as well as forecast data. In order to obtain forecast data, forecast models are run on the aggregated observational data 110. In one embodiment, separate forecast models are run for a plurality of weather categories. For example, an individual forecast model may be run for each of temperature, rainfall, snowfall, ice, wind, thunderstorms, fog, and/or any other potential weather category. The forecast models may generate multiple forecasts for a single geographic location. For example, for a chosen latitude and longitude, forecasts may be created for 15 minutes in the future, one hour in the future, one day in the future, or up to 10 days in the future. Of course, forecasts may be created for any increment of time less than, for example, 10 days in the future. For example, a second-by-second forecast is theoretically possible.

For a given time period—for example, 1 hour in the future—forecasts models may be run at a plurality of geographic locations. In one exemplary embodiment, forecast models are created at geographic locations that form a grid. For example, each geographic location may be selected as a point on a grid where the grid lines are spaced apart by about 4 km. In another embodiment, the grid lines are spaced apart by about 16 km. Any other spacing is possible, though grids with closer grid lines typically generate more data due to the additional grid points that are created. On the other hand, grids with grid lines that are spread further apart typically generate less data. The "resolution"—or amount of spacing between the lines of a grid—need not be consistent across all geographic areas. For example, a portion of the ocean where no ships, airplanes, or other transportation vehicles typically traverse may have a lower resolution—for example, 16 km, 32 km, or even greater. Densely populated areas, on the other hand, may call for grids with, for example, 1 km, 4 km, or 16 km. Any other resolution is possible for these grids.

Figure 2A:
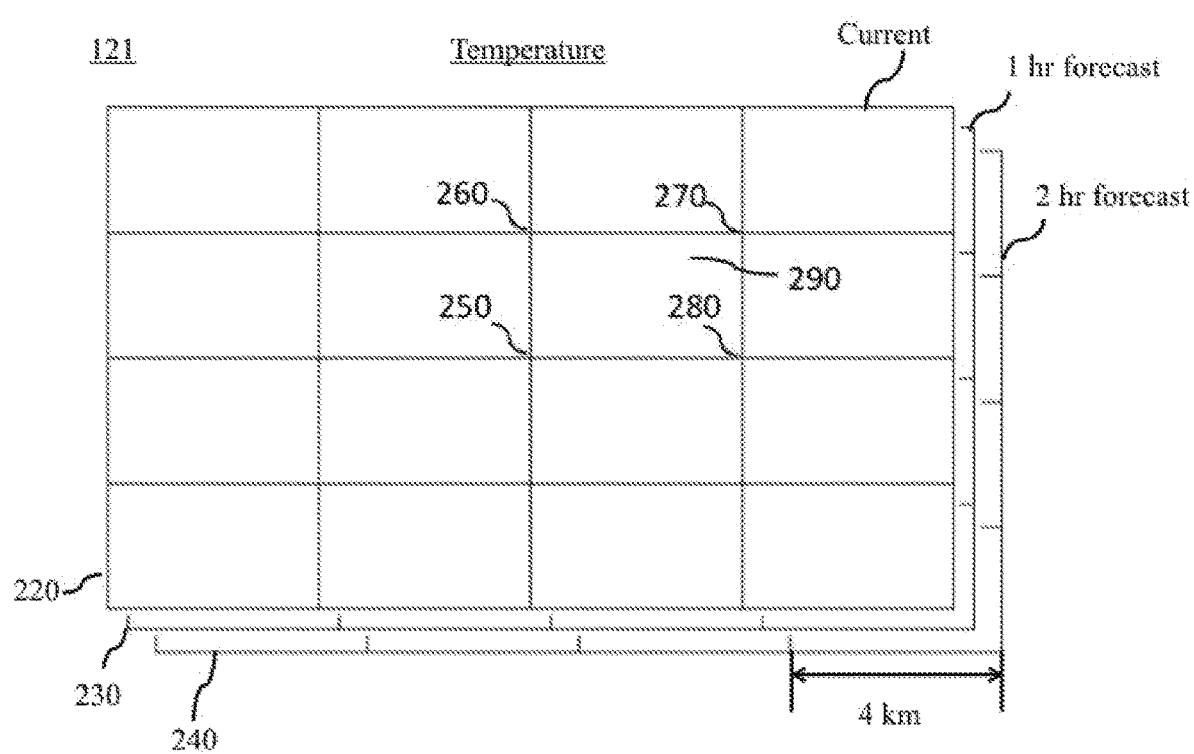
FIGS. 2A and 2B are representative illustrations of forecast grids.
Figure 2B:
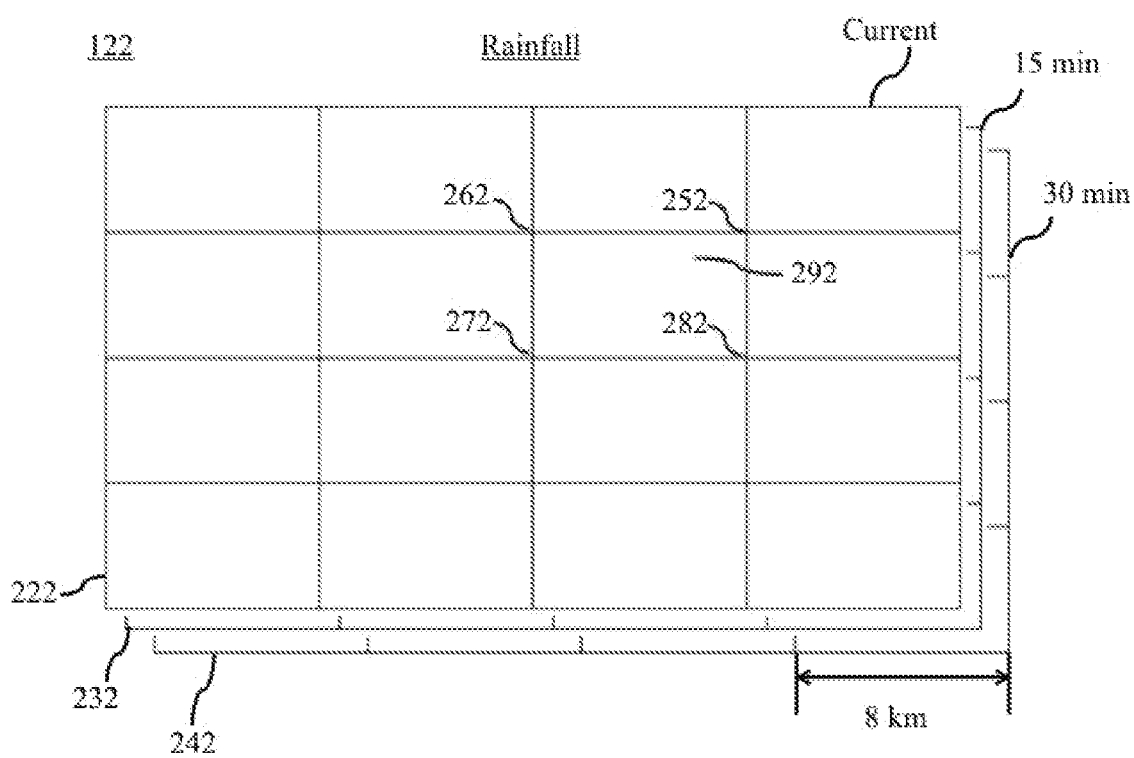

The aggregations of these grids may be considered forecast grids 120. Exemplary representations of these forecast grids 120 are shown in FIGS. 2A and 2B. For example, FIG. 2A is an exemplary embodiment of temperature forecast grids 121. Grid 220 may contain forecast data that aligns with current conditions. Grid 230 may contain forecast data for one hour in the future, while grid 240 may contain forecast data for two hours in the future. There may be any number of additional grids; either between grids 220, 230, and 240, or in addition to them. While this exemplary embodiment shows the grids in hourly increments, the increments chosen can be smaller or larger. Grid 220 comprises grid points 250, 260, 270, and 280. These grid points are exemplary points where forecast data exists. Each accompanying grid (i.e., 220, 230, 240, and so on) contains corresponding grid points 250, 260, 270, and 280. For example, grid point 250 may comprise a current temperature of 70° F. on grid 220, a forecast temperature of 72° F. on grid 230, and a forecast temperature of 74° F. on grid 240.

In the exemplary embodiment of FIG. 2A, the grid lines are spaced apart by approximately 4 km. As such, there may be points of interest that do not correspond directly with a grid point such as grid points 250, 260, 270, and 280. An example of this is point 290. Point 290 occupies the grid square created by grid points 250, 260, 270, and 280. In this situation, several methods may be used to provide a forecast for point 290. In one embodiment, a single forecast may be created for the entire grid square based on grid points 250, 260, 270, and 280. For example, grid points 250, 260, 270, and 280 may comprise forecast temperatures of 70° F., 70° F., 74° F., and 70° F., respectively, on grid 230. Taking an average of these values would result in a forecast temperature of 71° F. for that grid square on grid 230. In that embodiment, point 290 would be given a forecast temperature of 71° F. for the respective time period of grid 230.

In another embodiment, the relative location of point 290 to grid points 250, 260, 270, and 280 may be taken into account such that the data for each grid point is interpolated. For example, grid points 250, 260, 270, and 280 may comprise forecast temperatures of 70° F., 70° F., 74° F., and 70° F., respectively, on grid 230. If point 290 is closer to grid point 270, its interpolated forecast temperature may be, for example, 72° F. or 73° F.

FIG. 2B shows an exemplary embodiment where forecast grids 122 for rainfall are shown with a resolution of 8 km. For example, grid 222 may show current rainfall rates, while grid 232 may show forecasted rainfall rates 15 minutes in the future and grid 242 may show forecasted rainfall rates 30 minutes in the future. Similar to the forecast grids 121 of FIG. 2A, the forecast grids 122 of FIG. 2B have multiple grid points where the grid lines intersect, including, for example, grid points 252, 262, 272, and 282. Each accompanying grid (i.e. 222, 232, 242, and so on) contains corresponding grid points 252, 262, 272, and 282. For example, grid point 252 may comprise a current rainfall measurement of 0.5 in. on grid 222, a forecast rainfall measurement of 0.6 in. on grid 232, and a forecast rainfall measurement of 0.7 in. on grid 242.

In the exemplary embodiment of FIG. 2B, the grid lines are spaced apart by approximately 8 km. As such, there may be points of interest that do not correspond directly with a grid point such as grid points 252, 262, 272, and 282. An example of this is point 292. Point 292 occupies the grid square created by grid points 252, 262, 272, and 282. In this situation, several methods may be used to provide a forecast for point 292. In one embodiment, a single forecast may be created for the entire grid square based on grid points 252, 262, 272, and 282. For example, grid points 252, 262, 272, and 282 may comprise forecast rainfall measurement of 0.5 in., 0.5 in., 0.9 in., and 0.5 in., respectively, on grid 232. Taking an average of these values would result in a forecast rainfall measurement of 0.6 in. for that grid square on grid 232. In that embodiment, point 292 would be given a forecast rainfall measurement of 0.6 in. for the respective time period of grid 232.

In another embodiment, the relative location of point 292 to grid points 252, 262, 272, and 282 may be taken into account such that the data for each grid point is interpolated. For example, grid points 252, 262, 272, and 282 may comprise forecast rainfall measurement of 0.5 in., 0.5 in., 0.9 in., and 0.5 in., respectively, on grid 232. If point 292 is closer to grid point 272 than it is to any of the other grid points, its interpolated forecast rainfall measurement may be, for example, 0.7 in. or 0.8 in.

Turning back now to FIG. 1, forecast grids 120 are generated as described above. The forecast grids 120 may cover specific geographic locations, or may cover the entire globe. As mentioned earlier, the portions of the forecast grids 120 in remote areas may have a lower resolution, causing the grid points to be more widely spread but making it possible to cover large portions of the globe that are not high-interest locations.

In an exemplary embodiment, business rules 130 are applied to the forecast grids 120. In one embodiment, business rules 130 comprise mathematical formulas to apply to data located in the forecast grids. In another embodiment, business rules 130 comprise a threshold comparison that compares certain data, or the result of a mathematical formula applied to that data, to a threshold based on a particular period of time. In yet another embodiment, business rules 130 comprise a duration time based on the type of business rule 130. In an additional embodiment, business rules 130 comprise an informational weather notification with a predefined format. While these embodiments are described independently, business rules 130 may comprise more than one, and possibly all, of the illustrated embodiments. In additional, business rules 130 may comprises more embodiments not described here.

In one embodiment, business rules 130 are customized to the category of weather condition to which they are applied. For example, as mentioned above, business rules 130 may comprises mathematical formulas to be applied to data from the forecast grids.

For a weather condition category such as, for example, rainfall, a rainfall business rule may include the following formula:

$$QPF+QSF+\text{Sensible Weather}+\text{Temperature} \qquad (1)$$

In the formula provided above, "QPF" is a value representing the Quantified Precipitation Forecast from a respective forecast grid 120, "QSF" is a value representing the Quantified Snow Forecast from a respective forecast grid 120, "Sensible Weather" is a quantified value based on a respective forecast grid 120 that represents a general description of the weather, and "Temperature" is a value representing the temperature at a certain location from a respective forecast grid 120.

In an exemplary embodiment, formula (1) is used by a rainfall business rule 130. The rainfall business rule 130 may obtain a value, based on formula (1), and compare it to a threshold value, such as a rainfall threshold value. Alternatively or in addition, rainfall business rule 130 may calculate multiple values using formula (1) applied over a particular span of time—e.g., 12 hours—to arrive at a particular value. Rainfall business rule 130 may then compare the result of the formula, applied over that span of time, to a particular threshold value. In one embodiment, the threshold requirement is at least 2 in. of rain during a 12-hour time period. If the threshold value has been met or surpassed, rainfall business rule 130 can signal that a weather notification, such as a "Heavy Rain Notification," should be generated at the generate notification step 150. The weather notification may have a duration period of, for example, 6 hours.

In another embodiment, business rules 130 can be modified by conditional variables 140. Conditional variables 140 can be beneficial because different geographic regions have different qualifications regarding what type of weather condition is worthy of a weather notification. For example, if a snowfall business rule (discussed in more detail below) predicts 4 in. of snow over a 6-hour period, this prediction may only be worthy of a weather notification in certain geographic areas. A geographic area that routinely receives heavy snowfall would not need a weather notification. However, a large city in a warm climate may lack the necessary infrastructure for dealing with 4 in. of snow over a 6-hour period, and therefore should receive a weather notification. Conditional variables 140 can be used to remedy these types of differences between geographic areas.

Conditional variables 140 may be applied in a variety of ways. For example, they may be applied to the forecast grids 120 directly. Continuing the snowfall example above, a scientist may develop a mask that is overlaid on top of the forecast grids 120, with different regions of the globe representing different masks. The masks may be used in conjunction with business rules 130 to affect the outcome of a business rule 130 calculation. For example, the northern region of the United States may have a mask that indicates that, over a 6-hour period, only a predicted snowfall of at least 12 in. require a weather notification. Over the warmest regions of the United States, there may be no mask at all, or there may be a mask indicating that a predicted snowfall of, for example, at least 2 in. would require a weather notification. In this embodiment, the conditional variables 140 utilize the forecast grids 120 in order to correlate particular conditional variables 140 with particular grid points.

Conditional variables 140 may also be applied to the business rules 130 as a complementary grid. For example, a conditional variable 140 may comprise a grid showing elevation values at each of a plurality of grid points. The complementary grid preferably contains at least the same grid points as the forecast grids 120 being used for the calculations of formula (1). In an exemplary embodiment, a complimentary grid comprises elevation values for each grid point. The conditional variable 140 may utilize the elevation values to modify business rules 130 appropriately. For example, predicted snowfall may change based on elevation, with higher elevations more likely to receive precipitation as snow while lower elevations are more likely to receive precipitation as rain. Other types of conditional variables 140 are possible, and are not limited to the examples provided herein or to the methods of applying them discussed herein.

Additional types of business rules 130 can also be incorporated. In one embodiment, a snowfall business rule 130 may utilize the same formula provided for the rainfall business rule 130 but compare the result of the formula with, for example, a snowfall threshold value. Alternatively or in addition, snowfall business rule 130 may calculate multiple values using formula (1) applied over a particular span of time—e.g., 12 hours—to arrive at a particular value. Snowfall business rule 130 may then compare the results of the formula, applied over that span of time, to a particular threshold value. In one embodiment, the threshold requirement is at least 2 in. of snow during a 12-hour time period. If the threshold value has been met or surpassed, snowfall business rule 130 can signal that a weather notification, such as a "Heavy Snow Notification," should be generated at the generate notification step 150. The weather notification may have a duration period of, for example, six hours. Similar to the rainfall business rule 130, the snowfall business rule 130 may be modified by conditional variables 140. For example, a conditional variable with respect to snowfall amount may be applied via a grid. In that embodiment, different cities may have different threshold requirements for triggering a weather notification. For example the normal 2 in. threshold value may be modified for Québec, Canada to be, for example, 6 in.

In another embodiment, an ice business rule 130 may utilize formula (2) shown below:

$$QPF+QSF+\text{Sensible Weather}(\text{Freezing Rain, Light Freezing Rain, Heavy Freezing Rain, Freezing Drizzle, Freezing Drizzle/Fog})+\text{Temperature} \quad (2)$$

In formula (2), "QPF" is a value representing the Quantified Precipitation Forecast from a respective forecast grid 120, "QSF" is a value representing the Quantified Snow Forecast from a respective forecast grid 120, "Sensible Weather" is a quantified value based on a respective forecast grid 120 that represents a general description of the weather with respect to freezing rain, light freezing rain, heavy freezing rain, freezing drizzle, and freezing drizzle/fog, and "Temperature" is a value representing the temperature at a certain location from a respective forecast grid 120.

In an exemplary embodiment, formula (2) is used by an ice business rule 130. The ice business rule 130 may obtain one or more values, based on a formula, and compare it to a threshold condition. For example, a threshold condition may comprise two consecutive precipitation instances at a particular location. In this embodiment, because the threshold condition is based on consecutive precipitation instances, the threshold need not be time bound. In other embodiments, the threshold condition may comprise a particular number of precipitation instances within a predetermined period of time. If the threshold condition is met for ice business rule 130, a weather notification, such as an "Ice Notification," may be generated at the generate notification step 150. The weather notification may have a predetermined duration, or may be extended until there is a period of time at the relevant location where there is no forecast of a freezing precipitation instance. Of course, conditional variables 140 may be used to modify ice business rule 130 in any way, including methods similar to those described above with respect to other business rules.

In an additional embodiment, an extreme heat business rule 130 may utilize "Feels Like" temperature values. "Feels Like" temperature values are calculated based on temperature, humidity, wind speed, cloud cover, and/or other variables and are intended to reflect the subjective temperature sensation that a person would experience in that environment. For example, starting with a temperature of 25° F., the "Feels Like" temperature will generally decrease to, for example, 20° F., 15° F., and so on, as wind speed increases, to account for wind chill. In addition to utilizing "Feels Like" temperature values, extreme heat business rule 130 may incorporate a Departure Value calculation. The Departure Value calculation may reflect the difference between the current or forecasted "Feels Like" temperature and the historically average temperature. In another embodiment, the Departure Value reflects the difference between a current or forecasted "Feels Like" temperature and the historically average "Feels Like" temperature. In either case, extreme heat business rule 130 may compare the Departure Value to a threshold value. If the Departure Value meets or exceeds the threshold value for a predetermined period of time, extreme heat business rule 130 can signal that a weather notification, such as an "Extreme Heat Notification," should be generated at the generate notification step 150. In one embodiment, the calculation of whether the Departure Value meets or exceeds the threshold value may include the application of conditional variables 140, such as for example a climatology grid, to account for regional averages and other relevant differences between geographic locations. Of course, other uses of conditional variables 140 can be used as well.

In yet another embodiment, an extreme cold business rule 130 may perform a similar calculation based on the current and/or forecasted "Feels Like" temperatures and a calculated Departure Value. Again, the Departure Value may be based on a comparison to historical average temperatures or historical average "Feels Like" temperatures, or both. In this embodiment, however, if the Departure Value is equal to or less than a threshold value for extreme cold, the extreme cold business rules 130 may signal a weather notification, such as an "Extreme Cold Notification." Conditional variables 140, such as our example a climatology grid, may be used to increase accuracy and relevance based on geographic location. Other conditional variables 140 may be used as well.

In one embodiment, a high wind business rule 130 may be implemented. The high wind business rule 130 may utilize wind speed data. Wind speed data may include, for example, average or sustained wind speed and or wind gusts over any particular amount of time. For example, in one embodiment, high wind business rule 130 excludes wind speed data regarding gusts or bursts of wind over short durations, and instead considers sustained wind speed on an hourly basis. In this embodiment, high wind business rule 130 may compare sustained wind speeds to a threshold condition. As an example, the threshold condition may require three consecutive hours with sustained winds equal to or greater than 25 mph and at least one wind speed greater than 35 mph with a duration of at least one hour. Different threshold conditions may be used, however. Our example the threshold condition may require four consecutive hours with sustained winds equal to or greater than 25 mph and at least two of those hours having wind speeds greater than 30 mph. In another embodiment, high wind business rule 130 may also utilize wind gusts as a consideration for the threshold condition. In that embodiment, as an example, the threshold condition may require three consecutive hours with sustained winds equal to or greater than 25 mph and at least five wind gusts over 40 mph. Any other combinations of times, wind speeds, and/or wind bursts may be used.

If the threshold condition has been satisfied, high wind business rule 130 can signal that a weather notification, such as a "High Wind Notification," should be generated at the generate notification step 150. The weather notification may have a duration of, for example, three to six hours, or any other duration that is appropriate under the circumstances. High wind business rule 130 may be modified by conditional variables 140. For example, high altitude areas that constantly experience high winds may need a threshold condition incorporating higher wind speeds than a lower altitude area that rarely experiences high winds. Conditional variables 140 need be used to modify the threshold condition in other ways as well, and may be applied via a grid if desired.

In another embodiment, a thunderstorm business rule 130 may be utilized. The thunderstorm business rule 130 may incorporate, for example, Sensible Weather information regarding thunderstorms in any particular area. In this embodiment, Sensible Weather information includes hourly designations of, for example, "Thunderstorms," "Thunderstorm/Windy," and/or "Heavy Thunderstorms." Thunderstorm business rule 130 may compare the frequency of occurrences of these exemplary thunderstorm forecasts to a predetermined threshold condition. For example, the threshold may be met by one or more "Heavy Thunderstorm" forecasts within a three hour time period. The threshold may additionally/alternatively be met by four consecutive "Thunderstorm" and/or "Thunderstorm/Wendy" forecasts within a four hour time period. Thunderstorm business rule 130 may also use other threshold conditions over different periods of time. Thunderstorm business rule 130 may also consider other weather variables such as wind speed and/or rain, for example. If the threshold condition has been satisfied, thunderstorm business rule 130 can signal that the weather notification, such as a "Thunderstorm Notification," should be generated at the generate notification step 150. The notification may have a duration of, for example, three hours, or any other duration that is appropriate under the circumstances based on the type of Sensible Weather information provided. Of course, thunderstorm business rule 130 may be modified by conditional variables 140 in a manner similar to those discussed above with respect to other business rules.

In yet another embodiment, a fog business rule 130 can be used. Fog business rule 130 may utilize visibility data from forecast grids 120 as well as "Fog" and/or "Fog/Drizzle" indications from Sensible Weather information. Fog business rule 130 may compare these various inputs to a threshold condition to determine whether a warning should be instituted. For example the threshold condition may require at least three consecutive "Fog" events from Sensible Weather with at least one of them equal to or less than 0.5 mile visibility during three consecutive hours. Of course, the particular requirements of the threshold condition may be changed as appropriate. For example, the threshold condition may require at least two consecutive "Fog" events from Sensible Weather with at least one of them equal to or less than 0.25 mile visibility during two consecutive hours. Other threshold conditions may be used as well. If the threshold condition has been satisfied, fog business rule 130 can signal that a weather notification, such as a "Fog Notification," should be generated at the generate notification step 150. The weather notification may have a duration of, for example, at least three hours, or any other duration that is appropriate under the circumstances. Fog business rule 130 may be modified by conditional variables 140. Conditional variables 140 may be applied via a grid.

Figure 3:
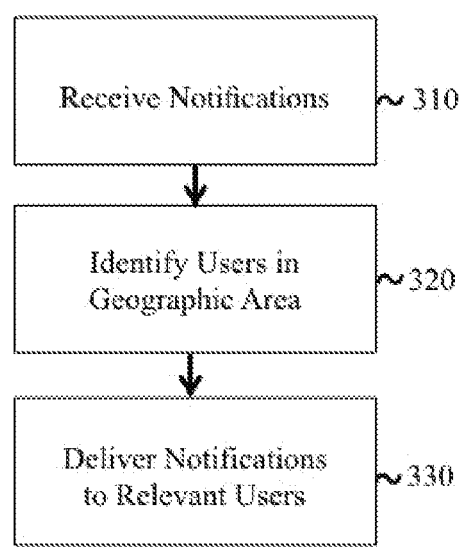
FIG. 3 is a flow diagram for a portion of the automated global weather notification system.

Turning now to FIG. 3, a portion of the automated global weather notification system is shown in the form of a flow diagram. As discussed earlier, various business rules 130 in the application of conditional variables 140 may generate notifications via the generate notifications step 150 of FIG. 1. FIG. 3 explores the generation of notifications in more detail, showing a flow diagram for an aggregated notification system. At step 310, requests for notifications are received at the aggregated notification system. At step 320, the notification system identifies users in a particular geographic area. Depending on the type of notification required, different subsets of users in different geographic areas may be targeted. For example, if the notification is applicable at the grid level, the notification may be sent only to users within the applicable grid points corresponding to the notification. A rainfall notification, for example, for a particular geographic location may be sent to users within that geographic location or within a certain number of miles from that geographic location. In one embodiment, notifications are sent to users determined to be traveling toward a geographic location affected by a notification. In that environment, for example, users on an interstate highway traveling toward a thunderstorm may receive a notification regarding the thunderstorm, even though it would not apply to their present position.

Users may be identified in a variety of ways. For example, users may be identified based on their IP address that is used to connect to a weather forecasting website such as weather.com. Users may also be identified based on their use of a mobile weather application installed on their smartphone or tablet device, or any other type of personal device. In addition, GPS sensors may be used to identify the current position of users and tailor notifications to a user's position. Users may also subscribe to a notification service and provide a preferred method of notification delivery. At step 330, notifications are delivered to the identified relevant users. For example, notifications may be sent via SMS, MMS, email, or any other telecommunication or fiber-optic service.

After a notification has been delivered to relevant users, there is no need to send a cancellation command or otherwise manually cause the notification to cease. Instead, each notification may have an automatic expiration mechanism. The automatic expiration mechanism may depend upon the type of notification (e.g., rainfall, snowfall, ice), the geographic location of the users receiving the notification, and/or the users' previously identified settings or preferences. By way of example, notifications may automatically expire after a six-hour period of time following the last triggering event. In other words, in that example, if a threshold condition for a notification is met at 2:00 PM and a notification is sent at that time, the notification may automatically expire at 8:00 PM. However, if the threshold condition continues to be met hourly from 2:00 PM until 5:00 PM, the expiration time for the notification may automatically reset each hour, therefore being pushed until 11:00 PM—six hours after the last instance of the threshold condition being met. Of course, the specific rules and expiration time periods for notifications may be changed and/or customized in any way. For example, a thunderstorm notification may require a shorter duration, and therefore may automatically expire three hours after the last instance of the thunderstorm threshold conditions being met. Other variables and conditions may be taken into account when determining the automatic expiration time of a particular notification.

Figure 4:
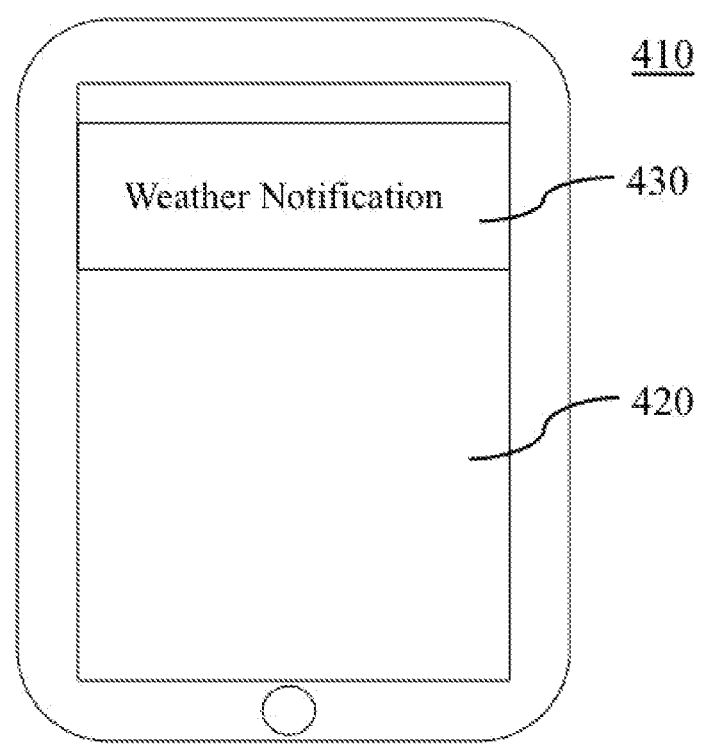
FIG. 4 is a representative illustration of an automated global weather notification being delivered on a user device.

FIG. 4 is a representative illustration of an automated global weather notification being delivered on a user device 410. User device 410 may be, for example, a smart phone or tablet device. User device 410 comprises a screen 420 showing information to the user. A weather notification banner 430 may be displayed at any location on screen 420. In FIG. 4, the weather notification banner 430 is shown as being displayed across the top portion of screen 420. However, any other type of notification system may be used, including integration with the smart phone or tablet devices' native notification system. While not shown, similar notifications may be displayed on the screen of, for example, a home computer or laptop being accessed by a user. The notification described herein is not limited to computers, smartphones, and tablet devices. Instead, the notification system may be used with any type of device capable of supporting and providing notifications.

Figure 5:
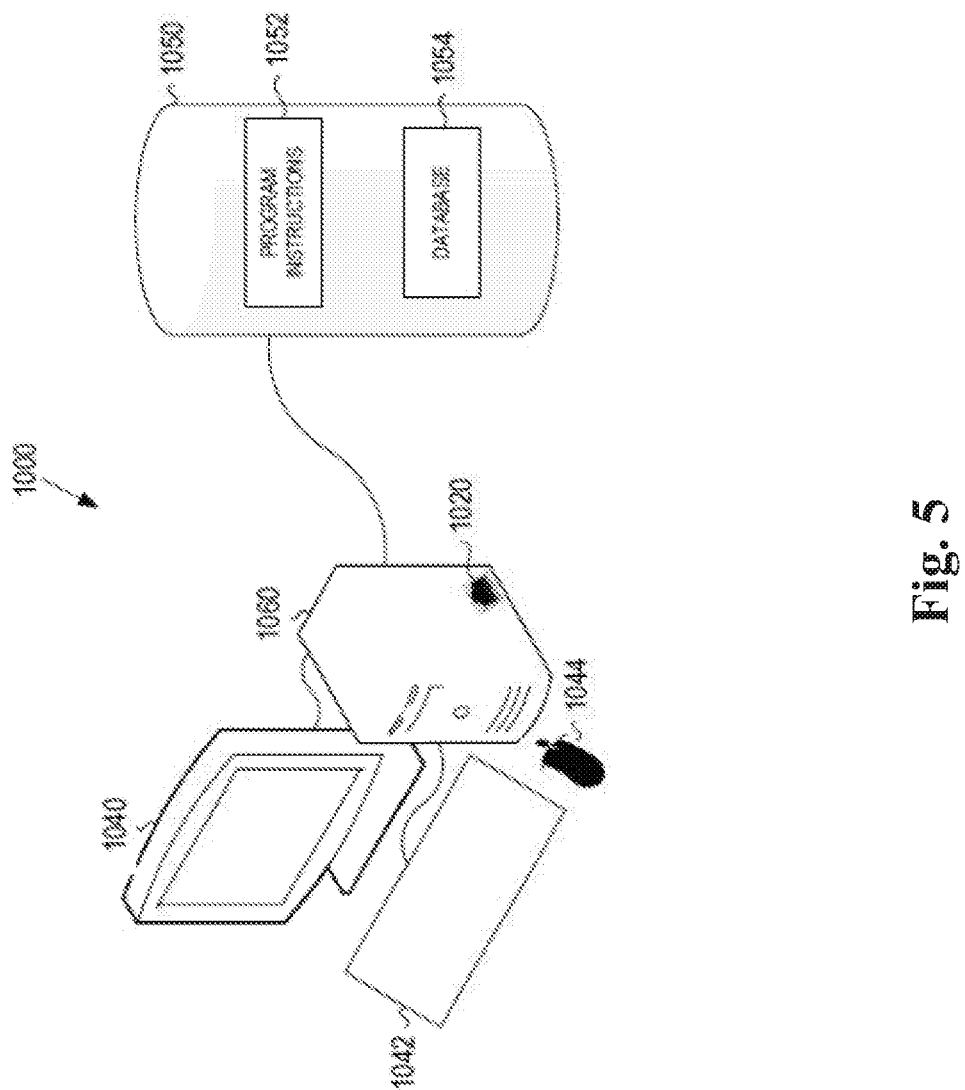
FIG. 5 is a block diagram illustrating a computer system for realization of a computer-implemented apparatus.

FIG. 5 is a block diagram illustrating a computer system 1000 for realization of a computer-implemented apparatus that may form all or a portion of one or more implementations or embodiments of the present disclosure. The computer system 1000 includes a computer 1060, a keyboard 1042, a mouse 1044, and a display device (e.g., computer monitor) 1040 through which the computer 1060 may receive input/provide output, for example to a user, operator or another computer or system (not shown). Input/output devices such as the display device 1040, keyboard 1042, the mouse 1044, and other means or mechanisms (e.g., touch screen interface) through which interaction with the computer system 1000 may occur are generally known in the art, and a detailed discussion thereof is omitted here for convenience only and should not be considered limiting. The computer 1060 includes a network port 1020 for connecting the computer to an internal or external network, such as, for example the network 20. The computer 1060 is connected to a storage device 1050 that includes program instructions 1052 for software application(s) that provides the logical functions of the computer-implemented apparatus and/or method(s) of the present disclosure. The storage device 1050 also contains a database 1054 for storing data.

Those skilled in the art will recognize that the program instructions 1052 for software applications implementing all or a portion of one or more embodiment(s) of the present disclosure may be written in a programming language such as Java or C++, and that the database 1054 may be implemented with a database package such as Microsoft Access™ or a database management system (DBMS) such as Microsoft SQL Server™, Microsoft SQL Server CE™, IBM DB2™, mySQL or postgreSQL.

Figure 6:
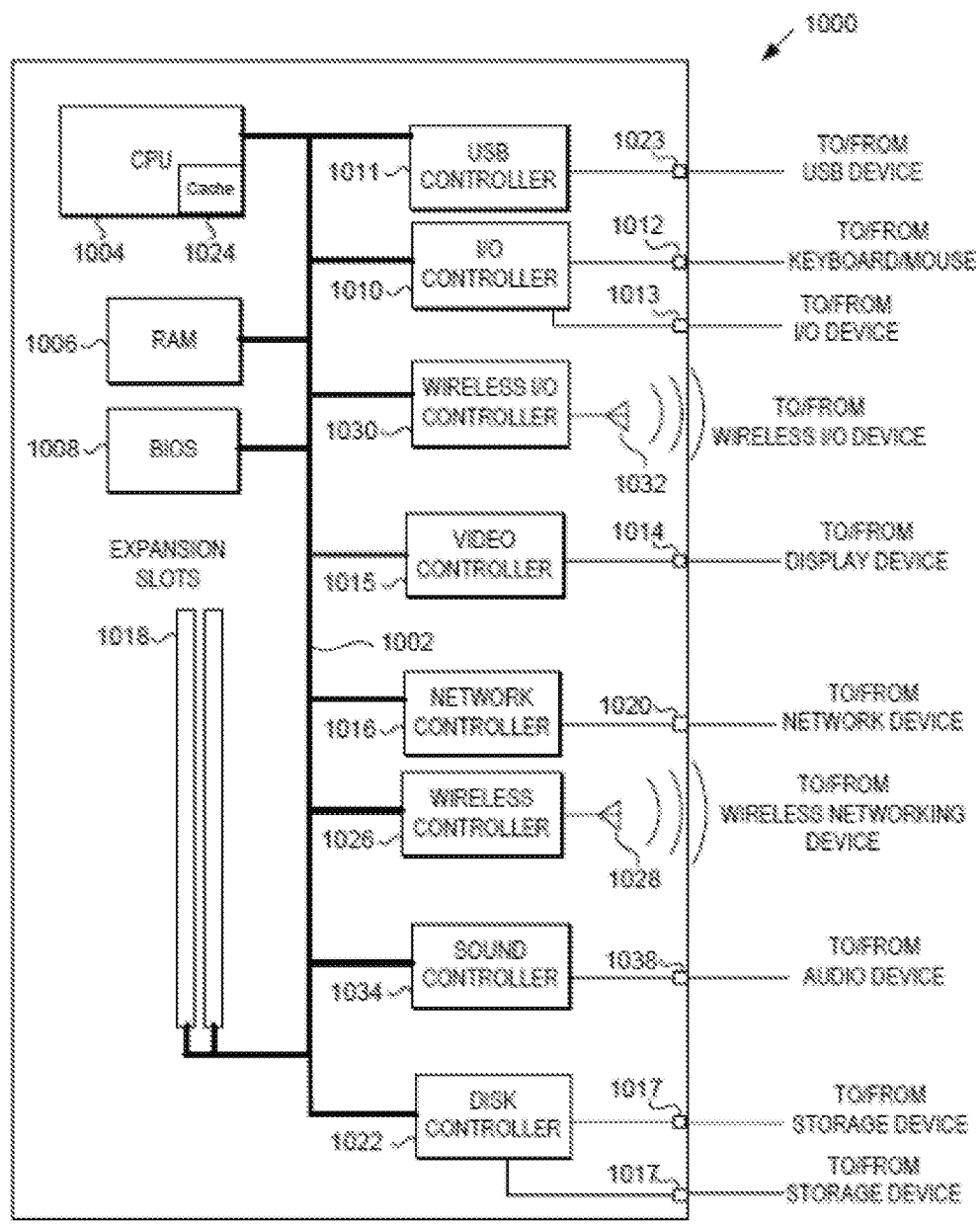
FIG. 6 is a block diagram illustrating a computer architecture of the system of FIG. 5.

FIG. 6 is a block diagram illustrating a computer architecture of the system 1000 through which the embodiments of the present disclosure may be implemented. A system bus 1002 transports data amongst the Central Processing Unit (CPU) 1004, RAM 1006, the Basic Input Output System (BIOS) 1008 and other components. The CPU 1004 may include a cache memory component 1024. The computer system 1000 may include one or more external storage ports 1017 for accessing a hard disk drive (HDD), optical storage drive (e.g., CD-ROM, DVD-ROM, DVD-RW), flash memory, tape device, or other storage device (not shown). The relevant storage device(s) are connected through the external storage port 1017 which is connected to the system bus 1002 via a disk controller 1022. A keyboard and/or pointing device (e.g., mouse, touch pad) can be connected to the keyboard/mouse port(s) 1012, and other I/O devices could be connected to additional I/O port(s) 1013, which are connected to the system bus 1002 through the I/O controller 1005. Additional ports or devices, such as serial ports, parallel ports, firewire adapters, or biometric devices (not shown), may be utilized through the I/O controller 1010. A display device can be connected to a display device port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002.

The computer system 1000 may be wirelessly connected to a network device that is configured for wireless operation (not shown), including but not limited to wireless routers, using an antenna 1028 connected to a wireless controller 1026 connected to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be connected to the USB port 1023 which is connected to the system bus 1002 through the USB controller 1011. Other devices, such as cellular phones, PDAs, and other portable devices may also be connected wirelessly via a wireless I/O antenna 1032 that is connected to a wireless I/O controller 1030. Examples of wireless I/O technologies include, but are not limited to, Bluetooth, Infrared (IR), and Radio-Frequency (RF). Audio devices, such as microphones, speakers, or headphones may be connected to a sound port 1038 that is connected to a sound controller 1034 that is connected to the system bus 1002. Expansion slots 1018 can include Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply connected to an external source of power, and/or an internal or external battery. These devices are generally well-know to those skilled in the art, and a detailed discussion thereof is omitted here for convenience only and should not be considered limiting.

The embodiments of the present disclosure may be implemented with any combination of hardware and software. If implemented as a computer-implemented apparatus, the present disclosure is implemented using means for performing all of the steps and functions described above.

The embodiments of the present disclosure can be included in an article of manufacture (e.g., one or more computer program products) having, for instance, computer useable or computer readable media. The media has embodied therein, for instance, computer readable program code means, including computer-executable instructions, for providing and facilitating the mechanisms of the embodiments of the present disclosure. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present disclosure is not limited to the particular examples and implementations disclosed herein, but is intended to cover modifications within the spirit and scope thereof as defined by the appended claims and any and all equivalents thereof.

What is claimed is:

1. A method of producing informational weather notifications, the method comprising:
    obtaining, by one or more processors, an aggregated forecast dataset corresponding to a geographic area, wherein the aggregated forecast dataset is aggregated from two or more datasets selected from a group consisting of a dataset associated with rainfall predictions for a plurality of forecast time periods, a dataset associated with snowfall predictions for the plurality of forecast time periods, a dataset associated with ice predictions for the plurality of forecast time periods, a dataset associated with heat predictions for the plurality of forecast time periods, a dataset associated with cold predictions for the plurality of forecast time periods, a dataset associated with wind for the plurality of forecast time periods, a dataset associated with thunderstorm predictions for the plurality of forecast time periods, and a dataset associated with fog predictions for the plurality of forecast time periods,
        wherein the datasets for the plurality of forecast time periods comprise a first forecast time period and a second forecast time period, wherein the first forecast time period is different from the second forecast time period, and
        wherein the datasets for the plurality of forecast time periods are organized in a grid structure having more than one spatial resolution, including a first spatial resolution and a second spatial resolution, wherein each spatial resolution defines a pre-defined set of spacing between grid elements having one or more forecast values, wherein the second spatial resolution is different from the first spatial resolution;
    evaluating, by the one or more processor, a plurality of pre-defined business rules specific to a targeted geographic location of a plurality of targeted geographic locations, wherein each targeted geographic location is located within, and as a portion of, the geographic area, wherein each evaluation comprises:
        comparing a threshold value for a notification defined in a business rule of the plurality of pre-defined business rules to one or more derived forecast values, each of the one or more derived forecast values being determined as an average or as an interpolation of a plurality of forecast values associated with respective neighboring grid elements in at least one of the two or more datasets for a given forecast time period, wherein the threshold value is varied based on an elevation associated with a second grid structure, wherein each element of the second grid structure has a data value associated with the elevation for the geographic area to which the second grid structure corresponds; and
        determining whether the notification associated with the comparison is at least a pre-defined duration from a last generated notification event, wherein the last generated notification event is a last forecast time period that the comparison associated with the notification is met and offset by a pre-defined expiration period; and in response to the evaluation, causing, by the one or more processor, for each targeted geographic location having a user of a plurality of users, transmission of an informational weather notification to each user of the plurality of users associated with the targeted geographic location.

2. The method of claim 1, further comprising delivering, via SMS (short message service), MMS (multimedia message service), or electronic mail, the informational weather notification associated with the targeted geographic location to the each user associated with the targeted geographic location.

3. The method of claim 1, further comprising delivering the informational weather notification associated with the targeted geographic location to a website being accessed by a client device, wherein the targeted geographic location is determined using an Internet Protocol (IP) address associated with the client device.

4. The method of claim 1, wherein each of the two or more datasets associated with the aggregated forecast dataset spans, at least, a portion of a globe.

5. The method of claim 1, wherein the business rule is based on a period of time less than 48 hours in a future.

6. The method of claim 1, wherein the business rule is based on a period of time of at least 3 hours.

7. The method of claim 1, further comprising comparing the weather data to a second threshold condition for a second notification category, and when the second threshold condition is met, producing an automated informational weather notification for the second threshold condition.

8. The method of claim 7, wherein the comparison of the threshold value and the comparison of the second threshold condition, respectively, are done independently of one another.

9. The method of claim 1, further comprising:
retrieving observational data from a weather data source for a plurality of geographic locations in the geographic area to obtain aggregated observational data; and
generating forecast models for the two or more datasets from the obtained aggregated observational data.

10. A system for producing informational weather notifications, comprising:
a database having stored thereon an aggregated global forecast dataset,
wherein the aggregated global forecast dataset is aggregated from two or more datasets selected from a group consisting of a dataset associated with rainfall predictions for a plurality of forecast time periods, a dataset associated with snowfall predictions for the plurality of forecast time periods, a dataset associated with ice predictions for the plurality of forecast time periods, a dataset associated with heat predictions for the plurality of forecast time periods, a dataset associated with cold predictions for the plurality of forecast time periods, a dataset associated with wind for the plurality of forecast time periods a dataset associated with thunderstorm predictions for the plurality of forecast time periods, and a dataset associated with fog predictions for the plurality of forecast time periods,
wherein the datasets for the plurality of forecast time periods comprise a first forecast time period and a second forecast time period, wherein the first forecast time period is different from the second forecast time period, and
wherein the datasets for the plurality of forecast time periods are organized in a grid structure having more than one spatial resolution, including a first spatial resolution and a second spatial resolution, wherein each spatial resolution defines a pre-defined set of spacing between grid elements having one or more forecast values, wherein the second spatial resolution is different from the first spatial resolution;
a processor; and
a memory having instruction stored thereon, the instruction comprising:
a plurality of pre-defined business rules to be applied to at least a subset of the aggregated global forecast dataset; and
a plurality of conditional variables to be applied to the subset of the aggregated global forecast dataset,
wherein execution of the instructions by the processor, cause the processor to:
evaluate the plurality of pre-defined business rules and the plurality of conditional variables specific to a targeted geographic location of a plurality of targeted geographic locations, wherein each targeted geographic location is located within, and as a portion of, a geographic area, and
wherein each evaluation comprises:
comparing a threshold value for a notification defined in a business rule of the plurality of pre-defined business rules to one or more derived forecast values, each of the one or more derived forecast values being determined as an average or as an interpolation of a plurality of forecast values associated with respective neighboring grid elements in at least one of the two or more datasets for a given forecast time period, wherein the threshold value is varied based on an elevation associated with a second grid structure, wherein each element of the second grid structure has a data value associated with the elevation for the geographic area to which the second grid structure corresponds; and
determining whether the notification associated with the comparison is at least a pre-defined duration from a last generated notification event, wherein the last generated notification event is a last forecast time period that the comparison associated with the notification is met and offset by a pre-defined expiration period; and
in response to the evaluation, cause for each targeted geographic location having a user of a plurality of users, transmission of an informational weather notification to each user of the plurality of users associated with the targeted geographic location.

11. The system of claim 10, further comprising a network, wherein the instructions when executed by the processor further cause the processor to automatically distribute the informational weather notification to users located in a relevant geographic location.

12. The system of claim 10, wherein each of the two or more datasets associated with the aggregated global forecast dataset spans, at least, a portion of a globe.

13. The system of claim 10, wherein the instructions, when executed by the processor, further cause the processor to:
retrieve observational data from a weather data source for a plurality of geographic locations in the geographic area to obtain aggregated observational data; and generate forecast models for the two or more datasets from the obtained aggregated observational data.

14. A non-transitory, computer-readable medium comprising instructions, wherein execution of the instructions causes a processor of a computing device to:

obtain an aggregated forecast dataset corresponding to a geographic area, wherein the aggregated forecast dataset is aggregated from two or more datasets selected from a group consisting of a dataset associated with rainfall predictions for a plurality of forecast time periods, a dataset associated with snowfall predictions for the plurality of forecast time periods, a dataset associated with ice predictions for the plurality of forecast time periods, a dataset associated with heat predictions for the plurality of forecast time periods, a dataset associated with cold predictions for the plurality of forecast time periods, a dataset associated with wind for the plurality of forecast time periods a dataset associated with thunderstorm predictions for the plurality of forecast time periods, and a dataset associated with fog predictions for the plurality of forecast time periods, wherein the datasets for the plurality of forecast time periods comprise a first forecast time period and a second forecast time period, wherein the first forecast time period is different from the second forecast time period, and wherein the datasets for the plurality of forecast time periods are organized in a grid structure having more than one spatial resolution, including a first spatial resolution and a second spatial resolution, wherein each spatial resolution defines a pre-defined set of spacing between grid elements having one or more forecast values, wherein the second spatial resolution is different from the first spatial resolution;

evaluate a plurality of pre-defined business rules specific to a targeted geographic location of a plurality of targeted geographic locations, wherein each targeted geographic location is located within, and as a portion of, the geographic area, wherein each evaluation comprises:

comparing a threshold value for a notification defined in a business rule of the plurality of pre-defined business rules to one or more derived forecast values, each of the one or more derived forecast values being determined as an average or as an interpolation of a plurality of forecast values associated with respective neighboring grid elements in at least one of the two or more datasets for a given forecast time period, wherein the threshold value is varied based on an elevation associated with a second grid structure, wherein each element of the second grid structure has a data value associated with the elevation for the geographic area to which the second grid structure corresponds; and determining whether the notification associated with the comparison is at least a pre-defined duration from a last generated notification event, wherein the last generated notification event is a last forecast time period that the comparison associated with the notification is met and offset by a pre-defined expiration period; and in response to the evaluation, cause for each targeted geographic location having a user of a plurality of users, transmission of an informational weather notification to each user of the plurality of users associated with the targeted geographic location.

15. The non-transitory, computer-readable medium of claim 14, wherein the instructions, when executed by the processor, further cause the processor to:

retrieve observational data from a weather data source for a plurality of geographic locations in the geographic area to obtain aggregated observational data; and generate forecast models for the two or more datasets from the obtained aggregated observation data.

* * * * *